(12) United States Patent
Chen et al.

(10) Patent No.: US 11,618,244 B2
(45) Date of Patent: Apr. 4, 2023

(54) MULTILAYER PACKAGE STRUCTURE FOR OZONE SCAVENGING

(71) Applicant: AdvanSix Resins & Chemicals LLC, Parsippany, NJ (US)

(72) Inventors: Haiming Chen, Shanghai (CN); Min Wang, Shanghai (CN)

(73) Assignee: AdvanSix Resins & Chemicals LLC, Parsippany, NJ (US)

( * ) Notice: Subject to any disclaimer, the term of this patent is extended or adjusted under 35 U.S.C. 154(b) by 0 days.

(21) Appl. No.: 16/649,778

(22) PCT Filed: Oct. 26, 2017

(86) PCT No.: PCT/CN2017/107787
§ 371 (c)(1),
(2) Date: Mar. 23, 2020

(87) PCT Pub. No.: WO2019/080042
PCT Pub. Date: May 2, 2019

(65) Prior Publication Data
US 2021/0146664 A1    May 20, 2021

(51) Int. Cl.
*B32B 27/08* (2006.01)
*B32B 27/30* (2006.01)
(Continued)

(52) U.S. Cl.
CPC ............ *B32B 27/08* (2013.01); *B32B 27/306* (2013.01); *B32B 27/32* (2013.01); *B32B 27/34* (2013.01);
(Continued)

(58) Field of Classification Search
CPC . B32B 27/08; B32B 2250/24; B32B 2250/05; B32B 27/36; B32B 27/34; B32B 27/32; B32B 27/306
See application file for complete search history.

(56) References Cited

U.S. PATENT DOCUMENTS 612,825 A    10/1898  Na
5,896,994 A   4/1999  Krebs
(Continued)

FOREIGN PATENT DOCUMENTS

CN    1328042 A    12/2001
CN    1507469 A     6/2004
(Continued)

OTHER PUBLICATIONS

Bynel 41E687 Data Sheet (Year: 2019).*
(Continued)

*Primary Examiner* — Ellen S Hock
(74) *Attorney, Agent, or Firm* — Faegre Drinker Biddle & Reath LLP (57) ABSTRACT

A package arrangement comprising a structure formed by a plurality of layers including an outer layer formed of a polymer material, one or more interior layers formed of a semi-aromatic polyamide composite material, and an inner layer formed of a polymer material, and an amount of water contained within the structure, the water including an amount of ozone dissolved therein, wherein the interior layer of the structure is configured to absorb oxygen and induce the degradation of the ozone.

22 Claims, 5 Drawing Sheets (51) Int. Cl.
  *B32B 27/32* (2006.01)
  *B32B 27/34* (2006.01)
  *B32B 27/36* (2006.01)
  *B65D 81/26* (2006.01)
  *B65D 90/02* (2019.01)

(52) U.S. Cl.
  CPC ............ *B32B 27/36* (2013.01); *B65D 81/266* (2013.01); *B65D 90/022* (2013.01); *B32B 2250/03* (2013.01); *B32B 2250/05* (2013.01); *B32B 2250/24* (2013.01); *B32B 2307/74* (2013.01); *B32B 2307/758* (2013.01); *B32B 2323/04* (2013.01); *B32B 2323/10* (2013.01); *B32B 2329/04* (2013.01); *B32B 2367/00* (2013.01); *B32B 2377/00* (2013.01); *B32B 2439/46* (2013.01); *B32B 2439/60* (2013.01); *B32B 2439/70* (2013.01)

(56) References Cited

U.S. PATENT DOCUMENTS

| | | | |
|---|---|---|---|
| 6,042,908 | A | 3/2000 | Long et al. |
| 6,132,825 | A * | 10/2000 | Frisk .................. B01J 31/06 428/35.7 |
| 6,193,827 | B1 | 2/2001 | Parks et al. |
| 6,410,156 | B1 | 6/2002 | Akkapeddi et al. |
| 6,632,874 | B2 | 10/2003 | Rule et al. |
| 6,878,457 | B2 | 4/2005 | Wood et al. |
| 7,186,464 | B2 | 3/2007 | Laplante et al. |
| 7,387,205 | B1 | 6/2008 | Wilson |
| 8,048,201 | B2 | 11/2011 | Dukes et al. |
| 8,148,466 | B2 | 4/2012 | Wood et al. |
| 8,394,474 | B2 | 3/2013 | Bekele |
| 8,496,885 | B2 | 7/2013 | Offord et al. |
| 8,568,894 | B2 | 10/2013 | Bernal-Lara et al. |
| 9,175,036 | B2 | 11/2015 | Kasher et al. |
| 2002/0193523 | A1 | 12/2002 | Akkapeddi et al. |
| 2003/0207056 | A1 | 11/2003 | Wood et al. |
| 2004/0028575 | A1 | 2/2004 | Iimura et al. |
| 2004/0222165 | A1 | 11/2004 | Michocki et al. |
| 2005/0131119 | A1 | 6/2005 | Wood |
| 2005/0176859 | A1 | 8/2005 | Tinkl et al. |
| 2007/0264520 | A1 | 11/2007 | Wood et al. |
| 2010/0000901 | A1 | 1/2010 | Jupin et al. |
| 2010/0075079 | A1 * | 3/2010 | Bernal-Lara .......... C08L 23/142 428/35.2 |
| 2010/0282633 | A1 | 11/2010 | Chau et al. |
| 2011/0257339 | A1 | 10/2011 | Fischer et al. |
| 2013/0270212 | A1 | 10/2013 | Collias et al. |
| 2015/0129454 | A1 | 5/2015 | Rule et al. |
| 2019/0291397 | A1 * | 9/2019 | Nakashima ............. B32B 27/08 |

FOREIGN PATENT DOCUMENTS

| | | |
|---|---|---|
| CN | 1609138 A | 4/2005 |
| CN | 106660315 A | 5/2017 |
| EP | 1366119 A2 | 12/2003 |
| EP | 1674522 A1 | 6/2006 |
| JP | 2004-050530 A | 2/2004 |
| JP | 2004-532296 A | 10/2004 |
| JP | 2006-183033 A | 7/2006 |
| KR | 10-2003-0085549 A | 11/2003 |
| KR | 10-2004-0050886 A | 6/2004 |
| WO | 02/70608 A2 | 9/2002 |
| WO | 2004/067273 A1 | 8/2004 |
| WO | 2018/110639 A1 | 6/2018 |

OTHER PUBLICATIONS

Mazille et al. SSWM University Course: Water Purification: Ozonation (Year: 2020).*
Bach et al., "Chemical migration in drinking water stored in polyethylene terephthalate (PET) bottles: a source of controversy", (2012), Online Available at https://halunivbourgogne.archivesouvertes.fr/hal00683918/document.
Bicknell et al., "Ozone disinfection of drinking watertechnology transfer and policy issues", Environmental engineering and policy vol. 3. Issues 1, 2001, 55-66.
Can et al., "Formaldehyde formation during ozonation of drinking water.", Ozone: science & engineering, vol. 25, No. 1, 2003, pp. 41-51.
European Supplementary Search Report and Search Opinion Received for EP Application No. 17929798.1, dated Apr. 29, 2021, 6 pages.
Grosvenor, "Strategies for minimizing ozonation byproducts in drinking water", Water Engineering & Management, vol. 146, No. 2, 1991, pp. 96-99.
International Preliminary Report on Patentability received for PCT Patent Application No. PCT/CN2017/107787, dated May 7, 2020, 5 pages.
International Search Report and Written Opinion received for PCT Patent Application No. PCT/CN2017/107787, dated Jun. 29, 2018, 6 pages.
Kaufman et al., "An overview of oxygen scavenging packaging and applications", Bakery Online, Apr. 8, 2013, pp. 1-5, online available at http://web.archive.org/web/20130408054343/https://www.bakeryonline.com/doc/anoverviewofoxygenscavengingpackagingan0002.
Portjanskaja, Elina., "Ozone reactions with inorganic and organic compounds in water", Encyclopedia of Life Support Systems (EOLSS). Ozone Science and Technology, accessed: Jun. 2017, http://www.eolss.net/samplechapters/c07/e61920600.pdf.
Teumac, F. N., The history of oxygen scavenger bottle closures, Active food packaging, Springer US, 1995, pp. 193-202, http://cst.ur.ac.rw/library/Food%20Science%20books/batch2/Active%20Food%20Packaging/01919_08.pdf.
Von Gunten, Urs. "Ozonation of drinking water: Part I. Oxidation kinetics and product formation." Water research 37.7 (2003): 14431467, http://www.alzheimer.rediris.es/pub/bscw.cgi/d422214/ozono%201.pdf.
White et al., "Ozonation Effect on Taste in Water Packaged in High Density Polyethylene Bottles", Journal of Dairy Science, vol. 74, Issue 1, Jan. 1991, pp. 96-99.
Zweep, Carol. "Oxygen scavengers: Advances in shelf life extension." NSFGFTC, gftc.ca, Apr. 2014, http://www.gftc.ca/knowledgelibrary/file.aspx?id=33406145f19b48fbb56e1e439a7d0151.

* cited by examiner

MULTILAYER PACKAGE STRUCTURE FOR OZONE SCAVENGING

CROSS-REFERENCE TO RELATED APPLICATION

This application is a U.S. 371 application of International Application No. PCT/CN2017/107787, filed 26 Oct. 2017, the entire disclosure of which is expressly incorporated by reference herein.

FIELD

The present invention relates to a multilayer package structure, specifically a multilayer structure configured to scavenge ozone from contents within the package structure.

BACKGROUND

Ozone is widely used for water sterilization, especially for potable water. In general, ozone is charged into bags or bottles made of various materials together with water. To make sure the sterilization is effective during the shipment and storage of the bagged and bottled water, excessive ozone is often pumped into the bags or bottles. As such, there is usually some residual ozone, occasionally in relatively high concentrations, left in the water just before an end user drinks the water, which will likely influence the taste and smell of the water.

In order to remove the ozone, some product manufacturers suggest the end user heat the water before drinking it to accelerate the decay of ozone. However, heating the water prior to drinking is often undesirable, or may be impracticable, for the end user prior to drinking. As such, it would be desired to provide methods or materials that can decrease the ozone concentration in the water before it is consumed by the end user, and thus there is a need for a material and/or method capable of scavenging ozone.

SUMMARY

In one embodiment of the present disclosure, a package arrangement is provided. The package arrangement includes a structure formed by a plurality of layers including an outer layer formed of a polymer material, one or more interior layers formed of a semi-aromatic polyamide composite material, an inner layer formed of a polymer material, and an amount of water contained within the structure, the water including an amount of ozone dissolved therein. The interior layer of the structure is configured to absorb oxygen and induce the degradation of the ozone.

In one aspect of the package arrangement, the polymer material of the inner layer is formed of one of a food grade polyolefin and a food grade polyester.

In another aspect of the package arrangement, the polymer material of the outer layer is formed of a food grade polyolefin, a food grade polyester, nylon, ethylene vinyl alcohol, or a polyamide based material.

In another aspect of the package arrangement, the outer layer and the inner layer are both formed of polyethylene terephthalate.

In a further aspect of the package arrangement, the plurality of layers further include at least one tie layer between any two of the plurality of layers.

In a further aspect of the package arrangement, the at least one tie layer includes a first tie material between the inner layer and the interior layer and a second tie material between the interior layer and the outer layer.

In another aspect of the package arrangement, the outer layer and the inner layer are each independently formed of one of polyethylene and polypropylene.

In a further aspect of the package arrangement, the plurality of layers further include a second interior layer between the interior layer and the second tie material, the second interior layer being formed of an ethylene vinyl alcohol material.

In another aspect of the package arrangement, the plurality of layers further include a third interior layer between the second interior layer and the second tie material, the third interior layer being formed of a polyamide material.

In another aspect of the package arrangement, the first and second tie material is formed of one of a polyolefin grafted unsaturated polybasic carboxylic acid, a polyolefin grafted unsaturated polybasic anhydride, and an olefin and alkyl ester copolymer.

In a further aspect of the package arrangement, the first and second tie material is formed of a polyolefin grafted unsaturated polybasic anhydride, the polyolefin grafted unsaturated polybasic anhydride being linear low density polyethylene grafted maleic anhydride.

In a further aspect of the package arrangement, the structure is rigid.

In another aspect of the package arrangement, the structure is flexible.

In a further aspect of the package arrangement, the structure is a bottle.

In another aspect of the package arrangement, the structure is one of a film and a bag.

In a further aspect of the package arrangement, the water includes between 0.001 to 0.5 $mg/m^3$ of ozone dissolved therein.

In another embodiment of the present disclosure, a method for scavenging ozone is provided. The method includes filling a structure formed of a plurality of layers with water sterilized with ozone, wherein the plurality of layers include an outer layer, at least one interior layer formed of a semi-aromatic polyamide composite material, and an inner layer formed of a polymer material, and sealing the structure. The interior layer of the structure is configured to absorb oxygen and induce degradation of the ozone within the water.

In one aspect of the method, the plurality of layers further include at least one tie layer between any two of the plurality of layers.

In a further aspect of the method, the at least one tie layer includes a first tie material between the inner layer and the interior layer and a second tie material between the interior layer and the outer layer.

In another aspect of the method, the water includes between 0.001 to 0.5 $mg/m^3$ of ozone dissolved therein.

BRIEF DESCRIPTION OF THE DRAWINGS

The above mentioned and other features of the invention, and the manner of attaining them, will become more apparent and the invention itself will be better understood by reference to the following description of embodiments of the invention taken in conjunction with the accompanying drawings.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate one or more embodiment of the invention, and such exemplifications are not to be construed as limiting the scope of the invention in any manner.

DETAILED DESCRIPTION

A package arrangement is disclosed comprising a structure configured to scavenge ozone present in water within the structure. A package arrangement of the present disclosure generally includes a structure formed from a multi-layer film, which contains an amount of water sterilized with ozone or aqueous ozone. The multi-layer film of the structure generally includes multiple layers formed from different polymers. As discussed further below, the present disclosure discloses a formed film in various shapes such as a bottle or a bag, for example, which includes 1 to as many as 30, or more layers including an outermost layer, an innermost layer and one or more layers there between. In various embodiments, any one layer may serve as the innermost layer, the outermost layer, and/or one or more layer there between.

For example, the multi-layer film generally includes an inner layer that is in contact with the sterilized water or aqueous ozone contained within the structure of the packaging apparatus. The main functions of the inner layer include allowing safe contact with food directly, being sealable, and providing good moisture barrier performance while also facilitating an amount of moisture propagation for oxygen scavenging via the mechanism as described below in detail. The inner layer may be formed of a food grade polyolefin such as polyethylene or polypropylene, or a food grade polyester such as polyethylene terephthalate. For a flexible structure, such as a bag, the inner layer may be formed of polyethylene or polypropylene. Polyethylene and polypropylene generally have good moisture barrier performance, and polyethylene may be used as a sealed layer for the multi-layer film due to its low melting point of approximately 120° C. In addition, polyethylene and polypropylene generally provide low oligomer content, high chemical and solvent resistance, high transparency, and low cost. For a rigid structure, such as a bottle, the inner layer may be formed of polyethylene terephthalate. Polyethylene terephthalate generally has fair moisture barrier performance, and can be semi-rigid to rigid. However, the moisture barrier performance of polyethylene terephthalate is not as good as that of polyethylene and polypropylene. In addition, polyethylene terephthalate has a higher purity compared to most nylon material, and generally provides good chemical and solvent resistance and high transparency.

Furthermore, the multi-layer film also generally includes an outer layer that faces the environment and is in contact with the atmosphere surrounding the structure. The outer layer may be formed of a food grade polyolefin such as polyethylene or polypropylene, a food grade polyester such as polyethylene terephthalate, nylon, ethylene vinyl alcohol, or a polyamide based material such as a semi-aromatic polyamide composite material (i.e., Aegis® barrier material, available from AdvanSix Resins & Chemicals LLC). In various embodiments, the outer layer is formed of a food grade polyolefin such as polyethylene or polypropylene, a food grade polyester such as polyethylene terephthalate, a nylon, or ethylene vinyl alcohol such that the outer layer protects the other layers from oxygen and/or moisture of the environment.

For a flexible structure, similar to the inner layer, the outer layer may be formed of polyethylene or polypropylene. Polyethylene and polypropylene generally have good moisture barrier performance, and polyethylene may be used as a sealed layer for the multi-layer film due to its low melting point of approximately 120° C. In general, polyethylene and polypropylene may also provide good transparency and good chemical and solvent resistance, such that they provide good protection to the other layers and the water inside the structure during the shelf life of the water. For a rigid structure, similar to the inner layer, the outer layer may be formed of polyethylene terephthalate. Polyethylene terephthalate generally has fair moisture barrier performance, and can be semi-rigid to rigid. In addition, polyethylene terephthalate may provide good transparency and good chemical and solvent resistance such that it too can provide good protection to the other layers and the food inside the structure.

The multi-layer film also includes an interior layer positioned between the inner layer and the outer layer. In general, the interior layer is formed of a polyamide based material, which provides strength and puncture resistance to the multi-layer film. The layer of polyamide based material also has the ability to scavenge oxygen and ozone. More specifically, the layer of polyamide based material has the ability to remove oxygen from the arrangement which drives the degradation of ozone into oxygen which can then be removed, resulting in the indirect scavenging of ozone. In various embodiments, the polyamide based material may be used as a single layer or it may be blended with a polyamide to form the interior layer.

Ozone is a relatively unstable compound that has a very short half-life (less than 30 minutes) after which it degrades into oxygen. The reaction between ozone and oxygen, shown below in reaction (I), has a specific reaction equilibrium constant that may be influence by temperature, pressure, and other factors.

$$2O_3(g) \rightleftharpoons O_2(g) \qquad (I)$$

Thus, ozone may degrade to oxygen quicker such that equilibrium is achieved between oxygen and ozone. One exemplary mechanism for the degradation of ozone is mechanism (I), as follows:

Initial Reaction $\quad O_3 + H_2O \rightarrow O_2 + OH\cdot \qquad (I)$
$\qquad\qquad\qquad O_3 + OH^- \rightarrow O_2^- + HO_2\cdot$
propagation reaction $\quad O_3 + OH\cdot \rightarrow O_2 + HO_2\cdot$
$\qquad\qquad\qquad O_3 + H_2O \rightarrow 2O_2 + OH\cdot$ Termination reaction $\quad 2HO_2\cdot \rightarrow O_2 + H_2O_2$, where the ozone reacts with the water to generate oxygen. Another exemplary mechanism for the degradation of ozone is mechanism (II), as follows:

(II)

a free radical chain reaction is occurring in the water.

As the layer of polyamide based material is scavenging oxygen, the removal of oxygen by absorption into the polyamide based material also drives the equilibrium to the right in reaction (I) above, increasing the degradation of the ozone to oxygen. By driving degradation of the ozone to oxygen, the layer of polyamide based material essentially operates to scavenge, or remove, ozone.

Oxygen scavenging in the polyamide based layer is activated by the presence of water, which permeates the inner and/or outer layers of the film facilitating a rapid initial ingress of oxygen and ozone. The presence of water also facilitates the diffusion of oxygen into the polymer bulk. Water acts as a plasticizer for nylon based materials, and increases the oxygen transmission rate of the nylon based materials (i.e., the layers of the multi-layer film). The oxygen is scavenged or removed by polyamides in the polyamide based material reacting with the oxygen in the presence of an initiator (i.e., moisture or water) and a catalyst (i.e., cobalt stearate) to produce oxidizing material as shown below, and thus induces the degradation of ozone in the water.

Figure 5:
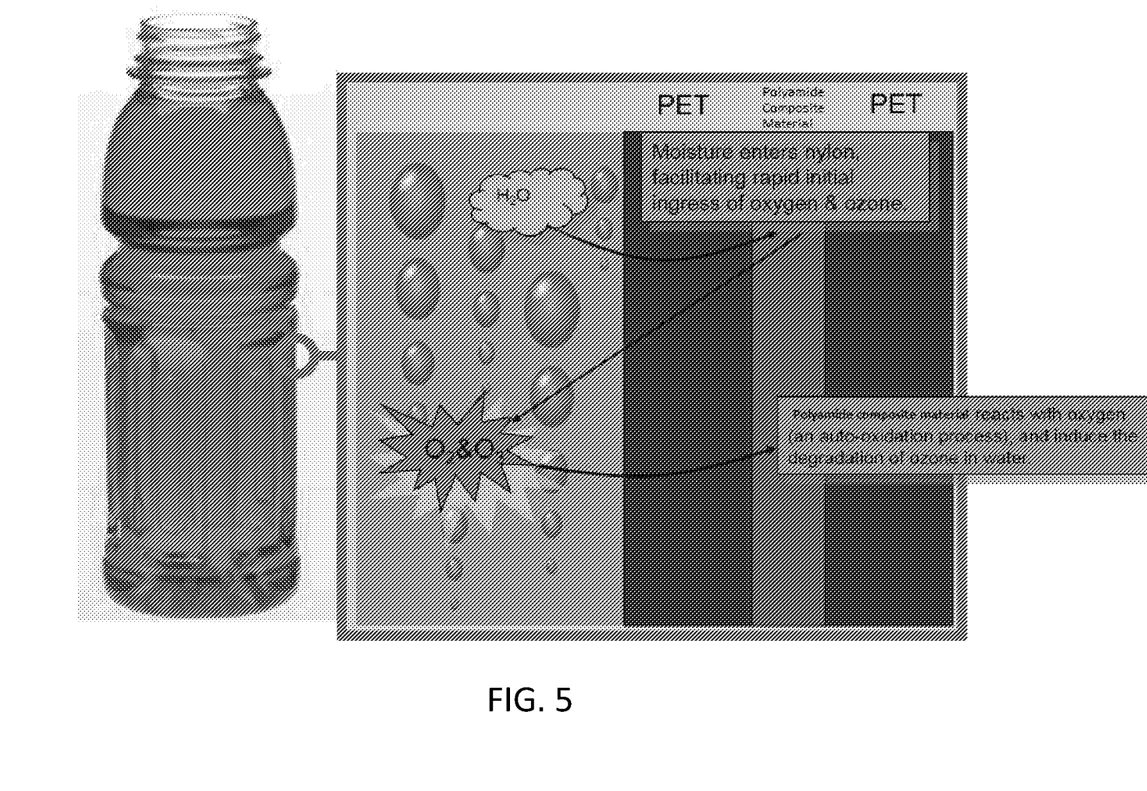
FIG. 5 shows a mechanism of a semi-aromatic polyamide composite material of the present disclosure scavenging oxygen.

In an exemplary embodiment, the polyamide based material is a semi-aromatic polyamide composite material. One suitable semi-aromatic polyamide composite material is Aegis® barrier material, available from AdvanSix Resins & Chemicals LLC. The mechanism oxygen scavenging polyamide based material is shown in FIG. 5. The semi-aromatic polyamide composite layer may be a flexural film formed by casting, blown, or biaxial orientation processes.

Typical polyamide or nylon-based materials capable of scavenging oxygen include an oxidizable polymer and a catalyst that reduces the activation energy required in order for the scavenger to be initiated by water. Oxidizable polymers typically comprise a blend of a crystalline polymer to provide structural stability, and an amorphous polymer which is semicrystalline and oxidizable, and optionally also unsaturated ethylenic hydrocarbons such as squalene, fatty acids, or polybutadine, in order to extend shelf-life for particularly oxygen-sensitive package contents. The unsaturated ethylenic hydrocarbons are usually functionally terminated with a chemical group to become compatible with the packaging materials.

Polyamide or nylon-based materials capable of scavenging oxygen typically contain a major component (i.e., more than 50 wt. % of the total material), and a minor component (i.e., less than 35 wt. % of the material). In various embodiments, the major component may be an amorphous nylon formed by one or more semi-aromatic polyamides and/or polyamide 6/66 copolymers, and the minor component may be polyamide 6.

The polyamide or nylon-based material may also include a catalyst to speed up the scavenging of oxygen. In various embodiments, the catalyst may be present in an amount less than 5 wt. % of the total weight of the polyamide composite material. The catalyst may be a transition metal salt, for example cobalt stearate. Optionally, an unsaturated ethylenic hydrocarbon may also be added to the polyamide or nylon-based material. The unsaturated ethylenic hydrocarbon may include unsaturated ethylenic hydrocarbons such as functionally terminated polybutadiene.

Other types of oxygen scavengers may also be used. For example, in dry food storage, certain polyunsaturated fatty acids (PUFAs) may be used. However, the use of PUFAs is restricted to when there is no water present since small amounts of moisture activate PUFAs scavenger and causes it to quickly lose its scavenging effect.

In various embodiments, the multi-layer film may further include additional interior layers positioned between the outer layer and the inner layer. For example, the multi-layer film may include one or more polyamide layers, formed of materials such as polyamide 6, polyamide 66, a copolymer of polyamide 6 and polyamide 66, polyamide 12, polyamide 6T, MXD6, and/or other types of polyamides, one or more layers formed from ethylene vinyl alcohol (EVOH), one or more layers formed of polyvinylidene fluoride (PVDF), one or more ethylene acrylic acid (EVA) layers, one or more polyvinyl chloride (PVC) layers, one or more polyvinylidene chloride (PVDC) layers, one or more polystyrene (PS) layers, one or more layers formed of polyolefin, such as polyethylene, polypropylene, or others, one or more layers formed of polyester, such as polyethylene terephthalate or others, and/or one or more other types of polymer layers that are suitable to be used in multilayer film for food packaging.

The main function of a polyamide or nylon layer is to provide strength, puncture resistance, flexural crack resistance, thermal stability, durability at low temperatures, and/or ultraviolet proof performance to the multi-layer film. The main function of a layer formed from EVOH is to act as an oxygen barrier and/or a moisture barrier. More specifically, the ethylene vinyl alcohol layer is configured to protect the semi-aromatic polyamide composite material layer from excessive exposure to oxygen, and thus prolong the shelf life of the semi-aromatic polyamide composite material layer. However, once moisture is absorbed, the oxygen barrier performance and transparency of the EVOH layer may decrease, while the haze of the EVOH layer may increase.

In various embodiments, the load of the semi-aromatic polyamide composite material layer may be between 1% and 60% depending on the package type or volume and/or the shelf life of the packaged food. Nevertheless, the semi-aromatic polyamide composite material layer may be present in the multi-layer film without the layer formed from EVOH.

The multi-layer film may also include one or more tie layers to facilitate adhesion between the various layers of the film. In some exemplary embodiments, the tie layers can be various polyolefins that have been heavily plasticized or tacified resulting in partially functionalized olefins that are functionalized with alcohol, amine, or acid groups. The polyolefins may be plasticized or tacified by additives such as tacking agents that include acrylic adhesives, resins (e.g., resins and their derivatives, terpenes and modified terpenes, aliphatic, cycloaliphatic and aromatic resins (C5 aliphatic resins, C9 aromatic resins, and C5/C9 aliphatic/aromatic resins), hydrogenated hydrocarbon resins, and terpene-phenol resins. For example, the tie layers may be formed from polyolefin grafted unsaturated polybasic carboxylic acid, polyolefin grafted unsaturated polybasic anhydride, and/or olefin and alkyl ester copolymer. An exemplary tie layer includes linear low density polyethylene grafted maleic anhydride, or LLDPE-g-MAH, grade name Bynol 41E687 from Dupont. The melting point of LLDPE-g-MAH is approximately 119° C., and the melting flow index is approximately 1.7 g/10 min according to ASTM D1238-04 (190° C./2.16 kg).

Based on the layers that make up the multi-layer film, the structure may be rigid or flexible such that the multi-layer film may be formed into a bottle, a bag, or any other similar structure or product/packaging. In various embodiments, the multi-layer film may be approximately 9-1500 μm thick, where each semi-aromatic polyamide composite material layer may be approximately 3-50 μm thick, each EVOH layer may be approximately 3-50 μm thick, each polyamide layer may be approximately 3-50 μm thick, and/or each outer layer and/or the inner layer may be approximately 5-700 μm thick. In one embodiment, the multi-layer film may be approximately 100 μm thick, where a semi-aromatic polyamide composite material layer may be approximately 10 μm thick, an EVOH layer may be approximately 10 μm thick, a polyamide layer may be approximately 10 μm thick, and an outer layer and/or an inner layer may each be approximately 35 μm thick.

The structure formed of the multi-layer film is filled with an amount of potable water, for example tap water or other drinking water, and sealed. The water contained within the structure is sterilized with ozone, such that ozone is dissolved into the water to create aqueous ozone. The ozone may be dissolved into the water by way of bubble diffusion, venturi injection, and/or static mixing. The aqueous ozone generally includes approximately 0.001 to 0.5 mg/m$^3$ of ozone.

Figure 1:
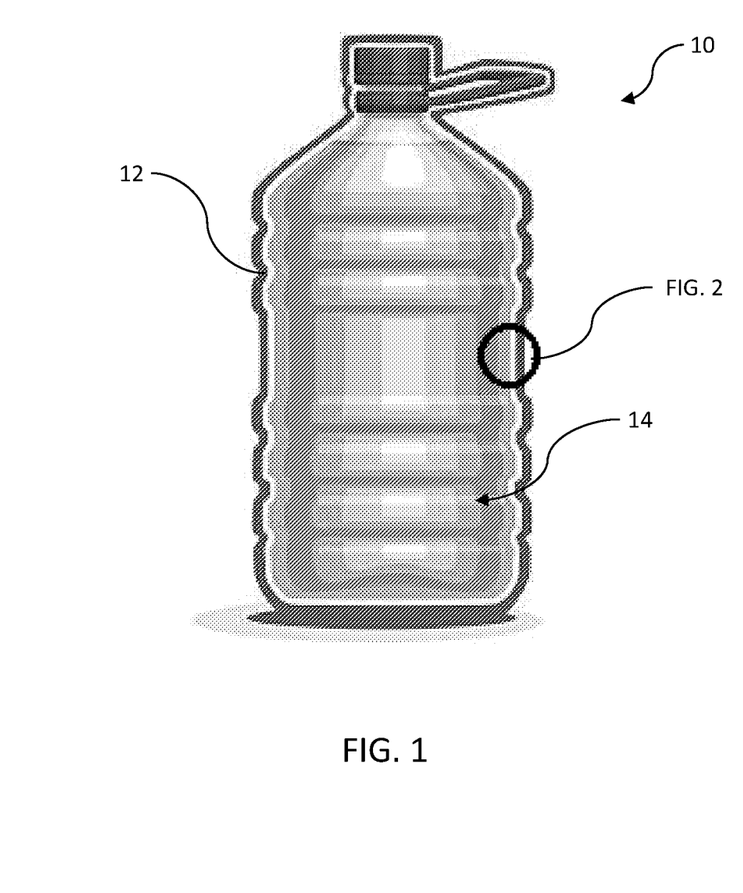
FIG. 1 shows an embodiment of a rigid package arrangement of the present disclosure.
Figure 2:
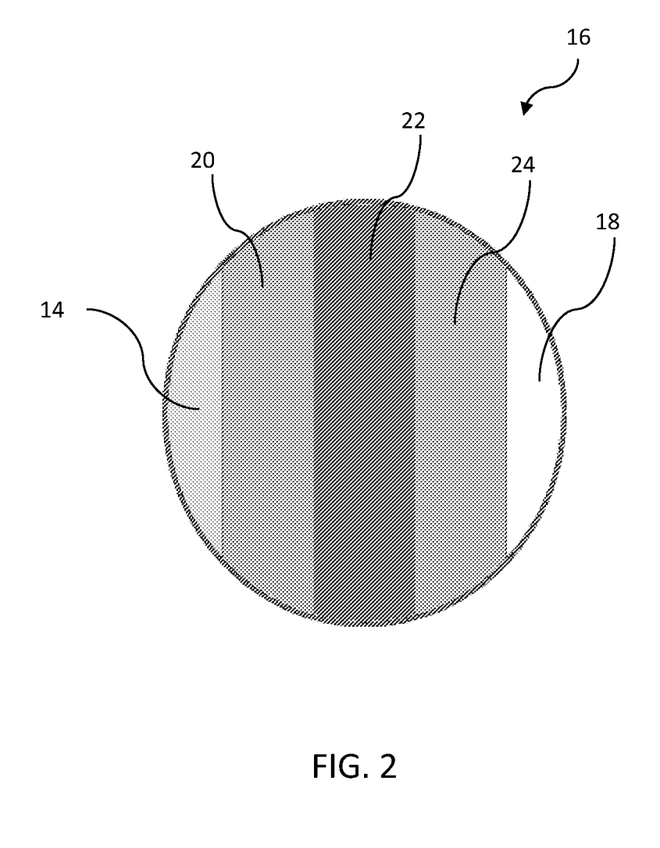
FIG. 2 shows a fragmentary sectional view through a portion of a structure of the package arrangement of FIG. 1.

Referring to FIG. 1, an exemplary embodiment of package arrangement 10 is shown including a structure 12 in the shape of a bottle filled with an amount of water sterilized with ozone 14. With reference to FIG. 2, a cross-section of an exemplary multi-layer film 16 of structure 12 is shown. In general, multi-layer film 16 includes a first polymer layer 20 adjacent the water 14 contained within package arrangement 10, a second polymer layer 24 adjacent the atmosphere 18, and a semi-aromatic polyamide composite layer 22 positioned between first polymer layer 20 and second polymer layer 24. In various embodiments, first polymer layer 20 and second polymer layer 24 may be independently formed of polyethylene, polypropylene, ethylene vinyl alcohol, polyamide, or polyethylene terephthalate. In an exemplary embodiment, first polymer layer 20 and second polymer layer 24 are both formed of polyethylene terephthalate (PET) such that structure or bottle 12 is rigid.

Figure 3:
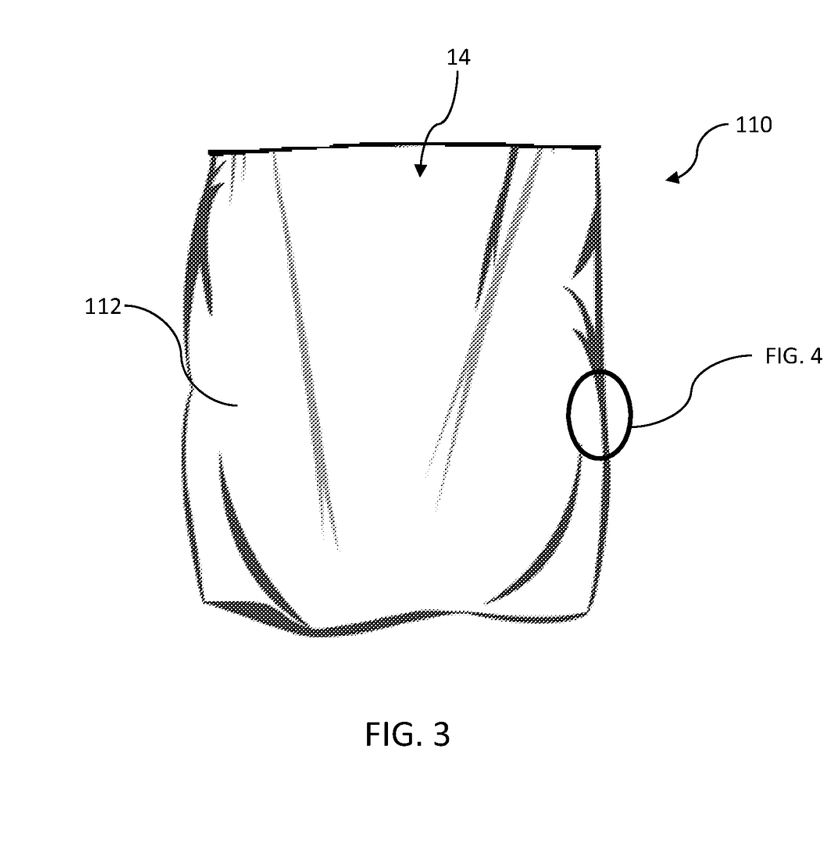
FIG. 3 shows an embodiment of a flexible package arrangement of the present disclosure.
Figure 4:
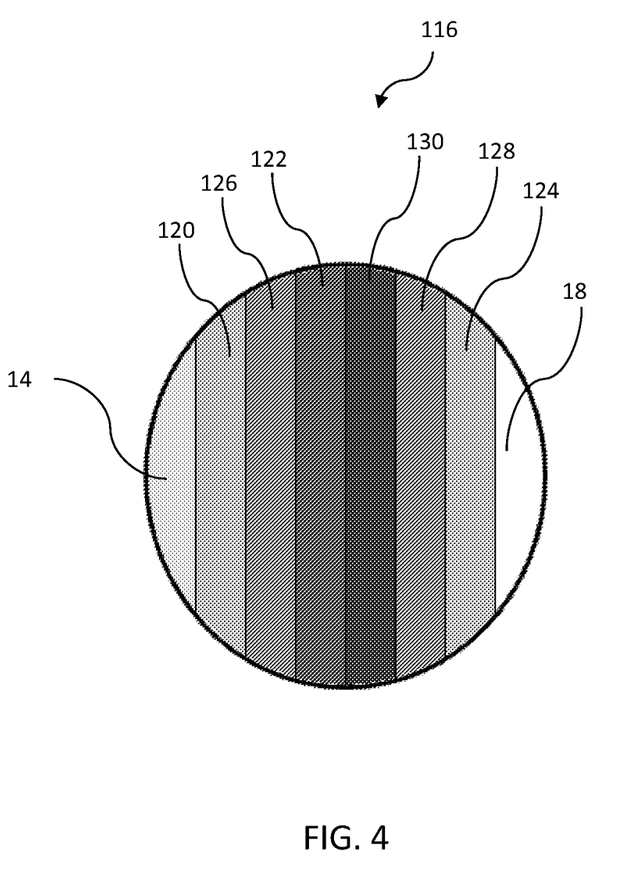
FIG. 4 shows a fragmentary sectional view of through a portion of a structure of the package arrangement of FIG. 3.

In some embodiments, the multi-layer film may include additional polymer layers between the outer layer and the interior layer and/or the inner layer and the interior layer. For example, and referring to FIG. 3, a second exemplary embodiment of package arrangement 110 is shown including a structure 112 in the shape of a bag filled with an amount of water sterilized with ozone 14 and sealed. With reference to FIG. 4, an exemplary multi-layer film 116 of structure 112 is shown. In general, multi-layer film 116 includes a first polymer layer 120 adjacent the water 14, a second polymer layer 124 adjacent the atmosphere 18, and a semi-aromatic polyamide composite layer 122 positioned between first polymer layer 120 and second polymer layer 124. In various embodiments, first polymer layer 120 and second polymer layer 124 may be independently formed of polyethylene, polypropylene, ethylene vinyl alcohol, polyamide, or polyethylene terephthalate. In an exemplary embodiment, first polymer layer 120 and second polymer layer 124 are both formed of polyethylene or polypropylene such that structure or bag 112 is flexible. In various embodiments, first polymer layer 120 and second polymer layer 124 may both be polyethylene or polypropylene, or first polymer layer 120 may be polyethylene and second polymer layer 124 may be polypropylene or vice versa. In addition, multi-layer film 116 further includes a first tie material layer 126 positioned between first polymer layer 120 and semi-aromatic polyamide composite layer 122, a second tie material layer 128 positioned between second polymer layer 124 and semi-aromatic polyamide composite layer 122, and a layer formed from ethylene vinyl alcohol 130 positioned between first tie material layer 126 and semi-aromatic polyamide composite layer 122. Layer 130 formed from ethylene vinyl alcohol is illustratively bonded to first polymer layer 120 by first tie material layer 126, and semi-aromatic polyamide composite layer 122 is illustratively bonded to second polymer layer 124 by second tie material layer 128.

Another exemplary multi-layer film includes layers 120, 122, 124, 126, 128, and 130 similar to structure 112 along with a polyamide layer positioned between layer 130 formed from ethylene vinyl alcohol and second tie material layer 128.

Yet another exemplary multi-layer film includes layers 120, 122, 124, 126, and 128 similar to structure 112 without layer 130 formed from ethylene vinyl alcohol.

EXAMPLES

Comparative Example 1

Two multilayer films of the below structures were prepared and analyzed.

Film structure 1 included a multi-layer film with a semi-aromatic polyamide composite layer of the structure:

(Inside) PE/Tie/semi-aromatic polyamide composite layer/EVOH/PA6,66 copolymer/Tie/PE (outside), where the total thickness was approximately 100 μm, the semi-aromatic polyamide composite layer thickness was approximately 10 μm, the EVOH layer thickness was approximately 10 μm, the polyamide 6,66 copolymer layer thickness was approximately 10 μm, and the polyethylene layer thickness was approximately 35 μm.

Film structure 2 included a multi-layer film without a semi-aromatic polyamide composite layer as a bench mark, where the multi-layer film had a structure of:

PE/Tie/PA6,66 copolymer/EVOH/PA6,66 copolymer/Tie/PE, where the total thickness was approximately 100 μm, the EVOH layer thickness was approximately 10 μm, the polyamide 6,66 copolymer layer thickness was approximately 10 μm, and the polyethylene layer thickness was approximately 35 μm.

Each multi-layer film was used to make a flexible bag with a volume of around 7.5 liters. Each bag was then filled with water that was ozone sterilized before being placed within the bags. The water-filled bags were stored for 3 months, and then the status, quality, smell, and odor of the water in each bag was compared by smelling the water and tasting the water. The test results indicated that the water in the bag made with film structure 1, which contained the semi-aromatic polyamide composite layer, had less odor compared to the water in the bag made with film structure 2, which did not include the semi-aromatic polyamide composite layer. It is well know that the odor of ozone sterilized water is caused by the excess ozone from the ozone sterilization. As such, it can be concluded that the semi-aromatic polyamide composite layer must have scavenged ozone directly or indirectly since film structure 2 had a stronger odor than film structure 1.

While this invention has been described as relative to exemplary designs, the present invention may be further modified within the spirit and scope of this disclosure. Further, this application is intended to cover such departures from the present disclosure as come within known or customary practice in the art to which this invention pertains.

The invention claimed is:

1. A package arrangement comprising:
   a structure formed by a plurality of layers including an outer layer formed of a polymer material, one or more interior layers formed of a semi-aromatic polyamide composite material, the semi-aromatic polyamide of at least one of the one or more interior layers comprising an oxidizeable polymer and a catalyst, and an inner layer formed of a polymer material, and
   an amount of water contained within the structure, the water including between 0.001 and 0.5 mg/m3 of ozone dissolved therein, and wherein the oxidizeable polymer of the interior layer of the structure absorbs oxygen and induces the degradation of the ozone.

2. The package arrangement of claim 1, wherein the polymer material of the inner layer is formed of one of a food grade polyolefin and a food grade polyester.

3. The package arrangement of claim 1, wherein the polymer material of the outer layer is formed of a food grade polyolefin, a food grade polyester, nylon, ethylene vinyl alcohol, or a polyamide based material.

4. The package arrangement of claim 1, wherein the outer layer and the inner layer are both formed of polyethylene terephthalate.

5. The package arrangement of claim 1, wherein the plurality of layers further include at least one tie layer between any two of the plurality of layers.

6. The package arrangement of claim 5, wherein the at least one tie layer includes a first tie material between the inner layer and the interior layer and a second tie material between the interior layer and the outer layer.

7. The package arrangement of claim 1, wherein the outer layer and the inner layer are each independently formed of one of polyethylene and polypropylene.

8. The package arrangement of claim 6, wherein the plurality of layers further include a second interior layer between the interior layer and the second tie material, the second interior layer being formed of an ethylene vinyl alcohol material.

9. The package arrangement of claim 8, wherein the plurality of layers further include a third interior layer between the second interior layer and the second tie material, the third interior layer being formed of a polyamide material.

10. The package arrangement of claim 9, wherein the outer layer and the inner layer are each independently formed of one of polyethylene and polypropylene.

11. The package arrangement of claim 6, wherein the first and second tie material is formed of one of a polyolefin grafted unsaturated polybasic carboxylic acid, a polyolefin grafted unsaturated polybasic anhydride, and an olefin and alkyl ester copolymer.

12. The package arrangement of claim 11, wherein the first and second tie material is formed of a polyolefin grafted unsaturated polybasic anhydride, the polyolefin grafted unsaturated polybasic anhydride being linear low density polyethylene grafted maleic anhydride.

13. The package arrangement of claim 1, wherein the structure is a bottle.

14. The package arrangement of claim 1, wherein the structure is one of a film and a bag.

15. The package arrangement of claim 1, wherein the oxidizeable polymer comprises a blend of a crystalline polymer and an amorphous polymer, the amorphous polymer semicrystalline and oxidizable.

16. The package arrangement of claim 15, wherein the semi-aromatic polyamide composite material further comprises an unsaturated ethylenic hydrocarbon.

17. The package arrangement of claim 16, wherein the unsaturated ethylenic hydrocarbon comprises a squalene, a fatty acid, or a polybutadine.

18. The package arrangement of claim 15, wherein the semi-aromatic polyamide composite material contains a major and a minor component, the major component being 50 wt % or more of the semi-aromatic polyamide composite material and comprising an amorphous nylon formed by one or more semi-aromatic polyamides and/or polyamide 6/66 copolymers, and the minor component being 35 wt % or less of the semi-aromatic polyamide composite material and comprising polyamide 6.

19. The package arrangement of claim 1, wherein the catalyst is present in an amount less than 5 wt. % of the total weight of the semi-aromatic polyamide composite material.

20. The package arrangement of claim 1, wherein the catalyst is a transition metal salt.

21. The package arrangement of claim 20, wherein the transition metal salt is cobalt stearate.

22. The package arrangement of claim 1, wherein the one or more interior layers formed of a semi-aromatic polyamide composite material is a flexural film formed by casting, blown or biaxial orientation processes.

* * * * *